US011606655B2

United States Patent
Ökvist et al.

(10) Patent No.: US 11,606,655 B2
(45) Date of Patent: Mar. 14, 2023

(54) MOBILE ELECTRONIC DEVICE AND AUDIO SERVER FOR COORDINATED PLAYOUT OF AUDIO MEDIA CONTENT

(71) Applicant: Telefonaktiebolaget LM Ericsson (publ), Stockholm (SE)

(72) Inventors: Peter Ökvist, Luleå (SE); Tommy Arngren, Södra Sunderbyn (SE); David Lindero, Luleå (SE); Till Burkert, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/294,449

(22) PCT Filed: Dec. 12, 2018

(86) PCT No.: PCT/EP2018/084455
§ 371 (c)(1),
(2) Date: May 17, 2021

(87) PCT Pub. No.: WO2020/119899
PCT Pub. Date: Jun. 18, 2020

(65) Prior Publication Data
US 2022/0021994 A1    Jan. 20, 2022

(51) Int. Cl.
*H04S 7/00* (2006.01)
*H04R 27/00* (2006.01)

(52) U.S. Cl.
CPC ............ *H04R 27/00* (2013.01); *H04S 7/301* (2013.01); *H04R 2227/005* (2013.01); *H04R 2420/07* (2013.01)

(58) Field of Classification Search
CPC .............. H04R 27/00; H04R 2227/005; H04R 2420/07; H04R 29/001; H04R 29/007; H04S 7/301
(Continued)

(56) References Cited

U.S. PATENT DOCUMENTS 8,712,328 B1    4/2014   Filev et al.
9,967,437 B1    5/2018   Meyers et al.
(Continued)

OTHER PUBLICATIONS

International Search Report and Written Opinion of the International Searching Authority for PCT International Application No. PCT/EP2018/084455 dated Sep. 6, 2019.
(Continued)

*Primary Examiner* — Disler Paul
(74) *Attorney, Agent, or Firm* — Sage Patent Group

(57) ABSTRACT

A mobile electronic device (device) operating with other devices form a group for wireless coordinated playout of audio media content. The processor performs operations that determine a common time sync shared with the other devices, and determine a timing of occurrence of a sound transient sensed relative to the common time sync. The operations receive timing reports from the other devices, where each of the timing reports indicates a timing of occurrence of the sound transient sensed at a respective one of the other devices relative to the common time sync. The sound transient sensed by the devices is generated at a preferred listening location. The operations coordinate timing of playout of audio media content by the group of devices responsive to comparison of the timing of occurrence of the sound transient sensed by the microphone of the device and the timing of occurrences indicated by the timing reports.

21 Claims, 10 Drawing Sheets

(58) Field of Classification Search
USPC .......................................... 381/77–83, 56, 59
See application file for complete search history.

(56) References Cited

U.S. PATENT DOCUMENTS

| | | | |
|---|---|---|---|
| 10,177,929 B1* | 1/2019 | Jorgovanovic | H04R 3/12 |
| 10,813,066 B2* | 10/2020 | Daley | H04H 20/38 |
| 2007/0087686 A1 | 4/2007 | Holm et al. | |
| 2008/0045140 A1 | 2/2008 | Korhonen | |
| 2010/0041330 A1 | 2/2010 | Elg | |

OTHER PUBLICATIONS

Tönges, "An augmented acoustics demonstrator with realtime stereo up-mixing and binaural auralization," Technische Universität Berlin, Audio Communication Group, Dec. 2015, 127 pages.

* cited by examiner

For each of the receiving timing reports, perform a cross-correlation between recordings of the sound transients in the timing reports to identify timing offsets — 1200

*Figure 12*

Receive measurements of magnitude over time of the sound transient sensed by the mobile electronic devices — 1300

Determine audio filter parameters for each of the mobile electronic devices in the group — 1302

Transmit audio filter messages to the mobile electronic devices in the group containing indications of the audio filter parameters determined for respective ones of the mobile electronic devices to control their filtering of the audio media content during playback — 1304

Filter the audio media content using the audio filter parameters to generate filtered audio media content, and communicate the filtered audio media content to the mobile electronic device for playback — 1306

*Figure 13*

MOBILE ELECTRONIC DEVICE AND AUDIO SERVER FOR COORDINATED PLAYOUT OF AUDIO MEDIA CONTENT

CROSS REFERENCE TO RELATED APPLICATION

This application is a 35 U.S.C. § 371 national stage application of PCT International Application No. PCT/EP2018/084455 filed on Dec. 12, 2018, the disclosure and content of which is incorporated by reference herein in its entirety.

TECHNICAL FIELD

The present disclosure relates to a mobile electronic device operating with other mobile electronic devices forming a group for coordinated playout of audio media content, a method by a mobile electronic device operating with other mobile electronic devices forming a group for coordinated playout of audio media content, an audio server for coordinated playout of audio media content through a group of mobile electronic devices, a method by an audio server for coordinated playout of audio media content through a group of mobile electronic devices, and corresponding computer program products.

BACKGROUND

Today's mobile phones are often used for music playout from online services including YouTube, Spotify, Soundcloud, etc. Some companies, including Apple and Google, have introduced home speakers that can be controlled wirelessly using smartphone applications.

When multiple speakers become available for audio playout in a room, it becomes important to synchronize the audio, e.g., music, playout to provide a desirable soundfield. One example is Sonos' AmpMe which allows several mobile devices (smartphones, tablets, . . . ) to join a synched group that enables synchronized streaming of music, e.g., from Spotify. The AmpMe app allows a "host" to synchronize playout of music with friends' mobile devices. The host can play music from SoundCloud, YouTube, Spotify, or a local library. Instead of relying on Bluetooth or Wi-Fi technology to connect devices together, AmpMe uses a server centric proprietary audio fingerprinting technology for synchronization and works with a cellular data plan, Wi-Fi network or personal hotspot. When the host selects the "play" button, friends will automatically see the nearby party and can select "join" to auto-sync their devices, thereby creating a synchronized group of devices for playing the music of their choice.

Chromecast Audio similarly allows multiple devices to be joined together into an audio group so they all play the same music selection irrespective of their location.

A potential problem with existing solutions is that known sound systems, when operationally capable, require manual tuning by a trained or otherwise properly coached human operator to establish a proper stereo or multi-channel soundfield for a particular spatial arrangement of sound speakers and the geometry of the targeted room/area for listening.

SUMMARY

Some embodiments disclosed herein are directed to a mobile electronic device operating with other mobile electronic devices forming a group for coordinated playout of audio media content. The mobile electronic device includes a wireless network interface circuit, microphone, speaker, a processor, and a memory. The wireless network interface circuit is configured for communication with the other mobile electronic devices through a wireless communication link. The processor operationally connects the microphone, the speaker, and the wireless network interface circuit. The memory stores program code that is executed by the processor to perform operations. The operations include determining a common time sync shared with the other mobile electronic devices, and determining a timing of occurrence of a sound transient that is sensed by the microphone relative to the common time sync. The operations receive timing reports from the other mobile electronic devices, where each of the timing reports indicates a timing of occurrence of the sound transient sensed by a microphone of a respective one of the other mobile electronic devices relative to the common time sync. The sound transient sensed by the mobile electronic devices is generated at a preferred listening location. The operations coordinate timing of playout of audio media content by the group of mobile electronic devices responsive to comparison of the timing of occurrence of the sound transient sensed by the microphone of the mobile electronic device and the timing of occurrences indicated by the timing reports.

A potential advantage of these operations is that a more optimally configured soundfield can be created at any preferred listening location where the sound transient is generated. These operations can be performed without requiring manual tuning by a human operator and without necessitating use of specialized hardware. Moreover, these operations can dynamically adapt the soundfield for observed variations over time in the spatial arrangement of the mobile electronic devices relative to the preferred listening location, the number of mobile electronic devices in a playout group, and/or acoustic effects of the listening room or area.

Some other embodiments disclosed herein are directed to an audio server for coordinated playout of audio media content through a group of mobile electronic devices. The audio server includes a network interface circuit, a processor, and a memory. The network interface circuit is configured for communication with the mobile electronic devices. The processor is operationally connected to the network interface circuit. The memory stores program code that is executed by the processor to perform operations. The operations include receiving timing reports from the mobile electronic devices. Each of the timing reports indicates a timing of occurrence of a sound transient sensed by a microphone of a respect one of the mobile electronic devices relative to a common time sync shared among the mobile electronic devices. The sound transient sensed by the mobile electronic devices is generated at a preferred listening location. The operations control timing of playout of audio media content by the group of mobile electronic devices responsive to comparison of the timing of occurrences indicated by the timing reports.

Other mobile electronic devices, audio servers, and corresponding methods and computer program products according to embodiments of the inventive subject matter will be or become apparent to one with skill in the art upon review of the following drawings and detailed description. It is intended that all such additional mobile electronic devices, audio servers, methods, and computer program products be included within this description, be within the scope of the present inventive subject matter, and be protected by the accompanying claims. Moreover, it is intended that all embodiments disclosed herein can be implemented separately or combined in any way and/or combination

BRIEF DESCRIPTION OF THE DRAWINGS

Aspects of the present disclosure are illustrated by way of example and are not limited by the accompanying drawings. In the drawings:

FIGS. 10-13 is a flowchart of operations that may be performed by the audio server that is operating as a master for controlling playout of audio media content by the playout group in accordance with some embodiments;

DETAILED DESCRIPTION

Figure 1:
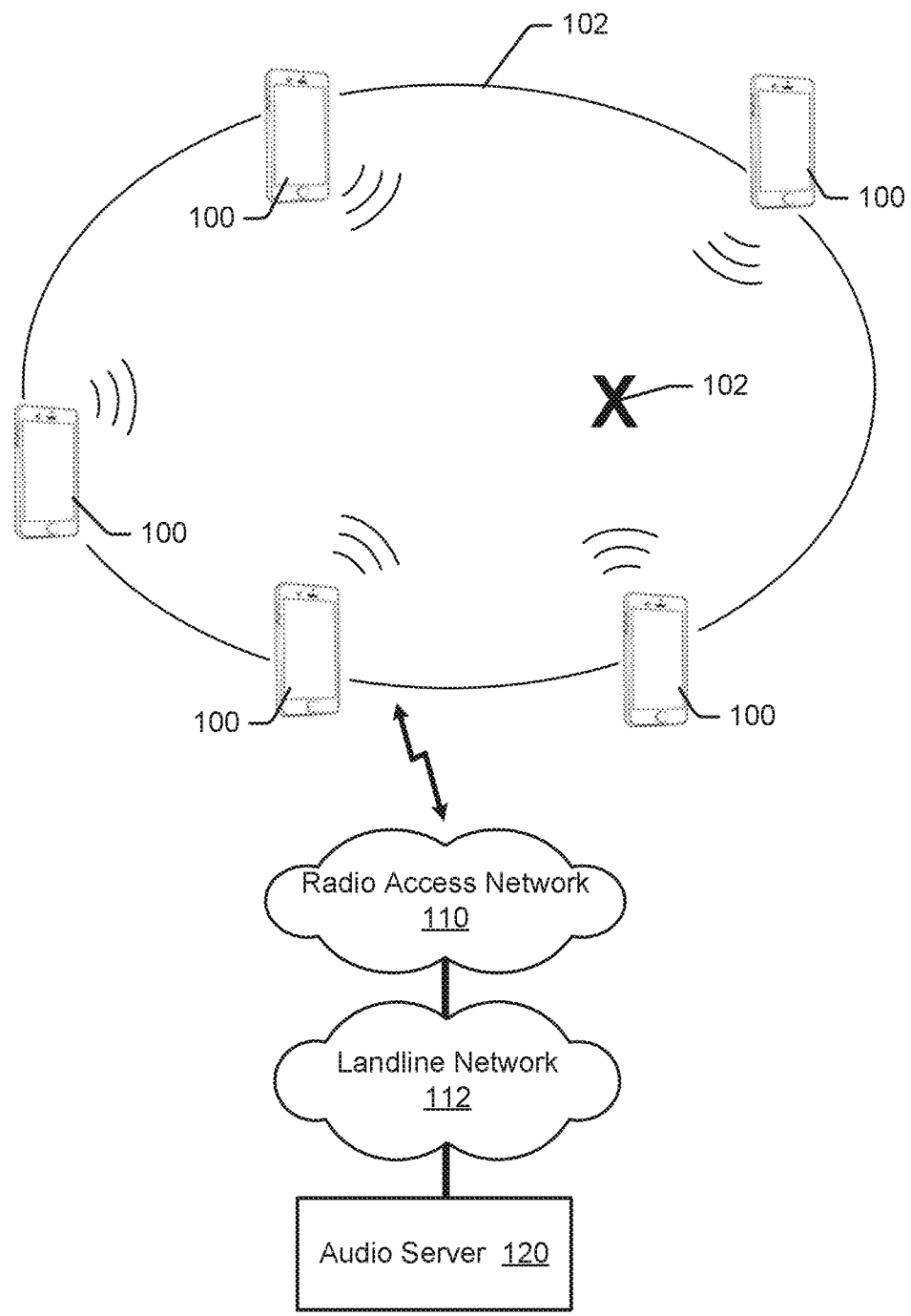
FIG. 1 illustrates a system that may operate to coordinate timing of playout of audio media content by a group of mobile electronic devices in accordance with various embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present or used in another embodiment.

Some embodiments are directed to methods and operations by mobile electronic device and audio server to provide a desired stereo soundfield for a particular spatial arrangement of sound speakers and the geometry of the acoustic effects of the targeted room/area. These methods and operations can be performed using existing hardware of the playout group to determine the room's reverberation and echo characteristics and to calculate therefrom the reverse audio propagation channel needed to aim an optimized stereo, or multi-channel, soundfield to a preferred listing location in the room. These approaches do not require the use of additional and dedicated hardware, which in turn would increase cost of deployment.

There are no previously known approaches where audio playout functionality of mobile electronic devices is analyzed and controlled to synchronize their playout to achieve a stereo image for a designated spatial location while operationally compensating for scenarios when one or more does not remain non-stationary and/or emerges to join the playout group or ceases being available to participate in the playout group.

If playout of media by the mobile electronic devices is not coordinated to form an optimized stereo or other multi-channel soundfield, the resulting sound effect to a listener can be undesirable with audio distortion being introduced to the listener from the out-of-synch arrival and additive effects of the individual audio waveforms at the listening location, stemming from uncorrected phase differences, and distortion introduced into the individual audio waveforms along their pathways to the listener.

Various embodiments of the present disclosure are directed to operations and methods that synchronize audio content playout through a group of mobile electronic devices based on using measurements by the mobile electronic devices of a sound transient and reverse sounding positioning techniques.

Reciprocity in Room Acoustics/Audio

For sound propagating in air, the principle of time-reversal or reciprocity applies. This means, given a solution to the acoustic wave equation, then the time reversal (using a negative time) of that solution is also a solution.

This means mobile electronic devices can be operated to record audio which is transmitted in one direction, which recorded audio reflects characteristics of the audio channel which change the transmitted audio, relying on the operational assumption of reciprocity, i.e., that the same changes that have happened to the audio transmitted in one direction will also happen when transmitting audio in the opposite direction. Operations according to various embodiments disclosed herein use reciprocity to coordinate and control the playout of audio content by a group of mobile electronic devices based on the transmission effects that these mobile electronic devices sense in a sound transient that is generated at a preferred listening location. These operations are extendable to environments having any number of mobile electronic devices as audio playout sources.

Overview of Proposed Solutions and Potential Advantages

Various embodiments of the present disclosure use speakers from any number of mobile electronic devices (mobile phones, tablet computers, media players, networked loudspeakers, etc.) to create a more optimized soundfield for a specific listener at a preferred listening location. For brevity and without limitation, a "mobile electronic device" is also referred to as a "mobile device" and "device."

Properly synchronizing the playout of media by the mobile electronic devices can create a soundfield with improved stereo or other multi-channel audio image which can provide a more enjoyable and better sounding music (or other audio media playout) experience. Various present embodiments do not require dedicated sounding hardware and can provide an easy-setup that can coordinate playout from any size group of mobile electronic devices to optimize the quality of the soundfield that is created at a preferred listening location.

FIG. 1 illustrates a system that can operate to coordinate timing of playout of audio media content by a group of mobile electronic devices 100 in accordance with various embodiments.

Referring to FIG. 1, the mobile electronic devices 100 are communicatively interconnected through a wireless communication link, such as a low latency protocol link (e.g., a device-to-device protocol or LTE side-link). A person who is located at a preferred listening location 102 can generate a sound transient by, for example, a hand-clap, table knock, providing a transient audio signal through a speaker of one of the mobile electronic devices 100, etc. Each of the mobile electronic devices 100 can be configured to determine a timing of occurrence of when the sound transient is sensed by a microphone of the mobile electronic device 100 Timing of playout of audio media content by the group of mobile electronic devices 100 is determined on a device-by-device basis responsive to comparison of the respective timing of occurrence of the sound transients determined by the respective mobile electronic devices. A more optimized stereo or multi-channel soundfield can thereby be generated at the preferred listening location.

The audio media content may be a song, sound track accompanying a video, an audiobook, or any other digital audio that can be played by a mobile electronic device through a speaker. The audio media content may be provided by an audio server 120 through a radio access network 110 and a landline network 112 (e.g., Internet). The audio server 120 may be a fileserver (e.g., Apple iTunes) that provides audio media content files to client applications hosted on the various mobile electronic devices 100 and/or may be an audio streaming service (e.g., Spotify, SoundCloud, Apple Music, or YouTube) that streams audio media content to the various mobile electronic devices 100. As will be explained in further detail below, one of the mobile electronic devices 100 may operate as a master that receives and relays the audio media content file and/or streams audio media content to the other mobile electronic devices 100.

In some embodiments, one of the mobile electronic devices 100 in the group can operate as a master that controls timing of playout of the audio media content by the other mobile electronic devices in the group. In some other embodiments, an audio server 120 (e.g., audio streaming server such as Spotify, YouTube, etc.) operates as the master to control timing of playout of the audio media content by the mobile electronic devices in the group. The master can control playout timing relative to a common time sync used by all of the mobile electronic devices in the group. The common time synch may be defined based on signaling from a Network Time Protocol (NTP) server, a received radio network timestamp or other timing signal, a satellite positioning system (e.g., GPS, GNSS, etc.) timestamp or other timing signal, or by other operations.

The master may stream the audio media content to the mobile electronic devices and/or generate parameters that are used by the mobile electronic devices to process (e.g., filter) the audio media content for playout. The master may generate the parameters to separately control processing by the various mobile electronic devices in ways that adjust for the relative positions of the mobile electronic devices relative to the preferred listening location to create a more optimized stereo soundfield at the preferred listening location. The master can control the timing of playout and/or determine the parameters to be used by the mobile electronic devices based on based on calculations of the reverse audio propagation channel needed to generate a more optimized stereo soundfield at the preferred listening location and/or based on calculations of audio characteristics (e.g., reverb, echo, etc.) of the room and positioning of the mobile electronic devices, which may be determined based on measurements of magnitude over time of the sound transient sensed by the mobile electronic devices.

Figure 2:
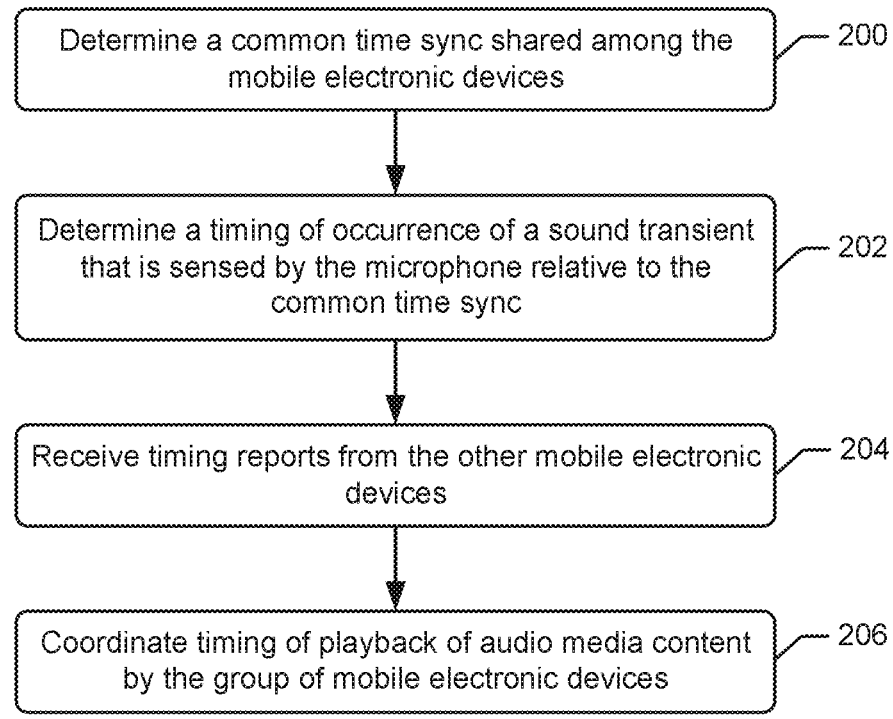
FIG. 2 is a flowchart of operations that may be performed by a mobile electronic device that operates with other mobile electronic devices forming a group for coordinated playout of audio media content in accordance with some embodiments.
Figure 14:
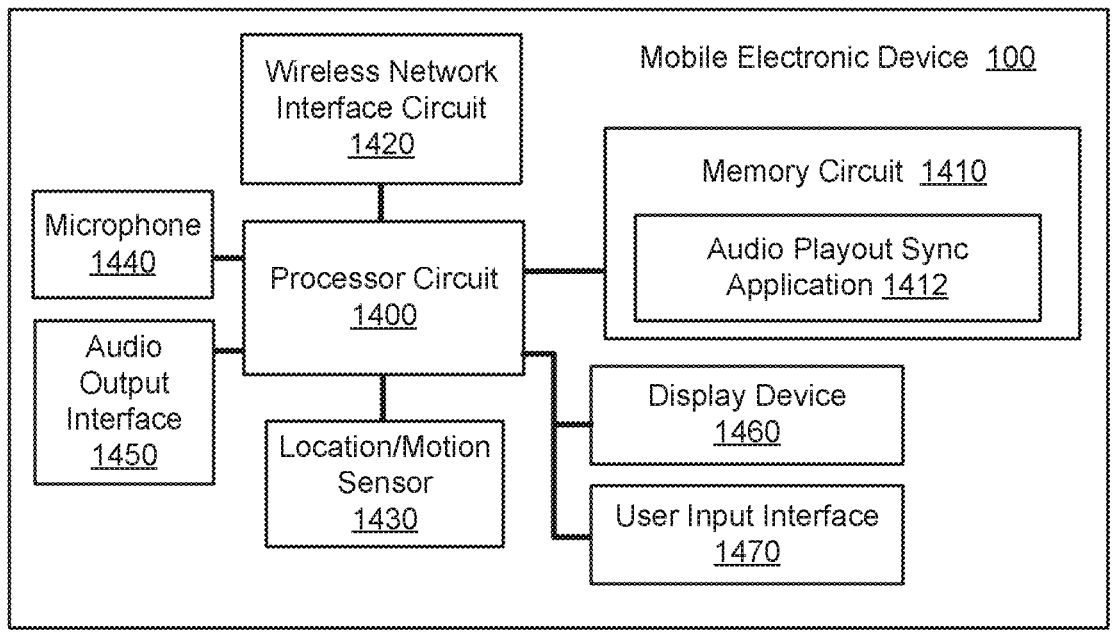
FIG. 14 is a block diagram of components of a mobile electronic device which are configured to operate in accordance with some embodiments.

FIG. 2 is a flowchart of operations that may be performed by a mobile electronic device 100 that operates with other mobile electronic devices forming a group for coordinated playout of audio media content, in accordance with some embodiments. FIG. 14 is a block diagram of components of a mobile electronic device 100 which are configured to operate in accordance with some embodiments.

Referring initially to FIG. 14, the mobile electronic device 100 can include: a wireless network interface circuit 1420 configured for communication with the other mobile electronic devices through a wireless communication link, either directly or via radio access network 110; a microphone 1440; a speaker 1450; a processor 1400 operationally connected to the microphone 1440, the speaker 1450, and the wireless network interface circuit 1420; and a memory 1410 storing program code 1412 that is executed by the processor 1400 to perform operations.

Referring now to FIG. 2, the operations can include determining 200 a common time sync shared with the other mobile electronic devices. The common time sync may be determined based on signaling from a NTP server or by other techniques as explained above. The operations determine 202 a timing of occurrence of a sound transient that is sensed by the microphone 1440 relative to the common time sync. The operations receive 204 timing reports from the other mobile electronic devices 100. Each of the timing reports indicates a timing of occurrence of the sound transient sensed by a microphone 1440 of a respective one of the other mobile electronic devices 100 relative to the common time sync. The sound transient sensed by the mobile electronic devices 100 is generated at a preferred listening location (e.g., 102 in FIG. 1). The operations then coordinate 206 timing of playout of audio media content by the group of mobile electronic devices 100 responsive to comparison of the timing of occurrence of the sound transient sensed by the microphone 1440 of the mobile electronic device 100 and the timing of occurrences indicated by the timing reports.

The operation to coordinate 206 timing of playout of audio media content may include controlling when individual ones of the mobile electronic devices 100 begin playing from a common location within the audio media content, which may thereby maintain constant timing offsets between where within the audio media content the mobile electronic devices 100 are playing through their respective speakers 1450. The common location from where the mobile electronic devices 100 begin playing may correspond to, for example, the start of a song or from another defined location within the song (e.g., a defined playback time location relative to the start of the song). The timing offsets can be controlled in-part to compensate for differences in the sound propagation times from the various mobile electronic devices 100 to the preferred listening location 102.

As an alternative, the operation to coordinate 206 timing of playout of audio media content may include controlling a relative time shift between audio played out by individual ones of the mobile electronic devices 100. The time shift of each individual mobile electronic device 100 relative to another device reflects the difference in respective distance between the two devices and the preferred listening location 102. In practice, they correspond to the time differences between sound propagation times from the preferred listening location 102, where the sound transient was generated, to the mobile electronic devices 100 in the group, as is explained further below.

First Aspects Related to a Mobile Electronic Device or Audio Server Operating as a Master As explained above, one of the mobile electronic devices 100 can operate as a master device to coordinates timing of playout of the music/other audio media content. The master may be responsible for distributing music or other audio media content to the other mobile electronic devices 100. For example, users may place their mobile electronic devices in their preferred listening locations within a room. The users each run an audio playout application on their mobile electronic devices, where the application is configured for playing music from locally stored music files or from a music stream that is received from another mobile electronic device and/or from the audio server 120 through a wireless communication link.

The master mobile electronic device (also referred to as "master device" for brevity) communicates with the other mobile electronic devices 100 through a wireless communication link, which may use a low latency protocol such as a device-to-device communication protocol (e.g., LTE sidelink protocol). The low latency protocol may, for example, be configured to provide less than less than 3 ms delay between the master mobile electronic device and the other mobile electronic devices 100.

In some embodiments, the operations that are described as being performed by the master mobile electronic device may be performed in a distributed manner by more than one of the mobile electronic devices within an audio playout group, by the audio server 120, and/or by a combination of one or more mobile electronic devices and the audio server 120.

With further reference to FIG. 2, the mobile electronic device 100 that is operating as a master may perform the operation for coordinating 206 timing of playout of audio media content by the group of mobile electronic devices 100 by controlling timing when individual ones of the mobile electronic devices 100 in the group initiate the playout from a common location within the audio media content to reduce time offsets between when sound emitted by the individual ones of the mobile electronic devices 100 from the playout arrives at the preferred listening location 102 where the sound transient was generated.

The operation by the master mobile electronic device for coordinating 206 timing of playout of audio media content by the group of mobile electronic devices 100 can include determining an audio playout start time relative to the common time sync based on comparison of the timing of occurrence of the sound transient sensed by the master mobile electronic device to the timing of occurrences of the sound transients sensed by other ones of the mobile electronic devices 100, and initiating playout by the master mobile electronic device from the common location within the audio media content through the speaker 1450 when the audio playout start time satisfies a defined rule relative to the common time sync. For each of the other mobile electronic devices 100, the master mobile electronic device determines another audio playout start time relative to the common time sync based on comparison of the timing of occurrence of the sound transient sensed by the other mobile electronic devices 100 to the timing of occurrences of the sound transients sensed by other ones of the mobile electronic devices 100, and transmits a playout timing message to the other mobile electronic devices 100 containing an indication of the other audio playout start time relative to the common time sync indicating when the other mobile electronic device 100 is to initiate playout from the common location within the audio media content. As an alternative, the master device may determine a relative time shift between audio played out by individual ones of the mobile electronic devices 100 based on comparison of the timing of occurrence of the sound transient sensed by the other mobile electronic devices 100 to the timing of occurrences of the sound transients sensed by other ones of the mobile electronic devices 100, and transmit a playout timing message to the other mobile electronic devices 100 containing an indication of the relative time shift.

In a further embodiment, the operation by the master mobile electronic device for coordinating 206 timing of playout of audio media content by the group of mobile electronic devices 100 includes determining time differences between sound propagation times from the preferred listening location 102 where the sound transient was generated to the mobile electronic devices 100 in the group based on differences between the timing of occurrences sensed by the mobile electronic devices 100 in the group, and then determining the audio playout start time, or a relative time shift, for individual ones of the mobile electronic devices 100 in the group based on the time differences.

Which one of the mobile electronic devices 100 in the group is selected to operate as the master may be determined based on comparison of the capabilities of the various mobile electronic devices 100 in the group. For example, any of the mobile electronic devices 100 that has less than a threshold level of available memory capacity for the audio application, less than a threshold level of processor speed, less than a threshold level of quality of service of communication link to the other mobile electronic devices 100, and/or which is not programmatically configured to operate as a master can be excluded from being selected as a master. The master device may be selected based on it being the first one of the mobile electronic devices 100 to initiate execution of the audio application. The master device may alternatively be selected based on it being the only one of the mobile electronic devices 100 that has access to the audio media content on an audio server, e.g., by virtue of a subscription to a streaming service like Spotify. Selection of the master device may be made by one or more of the mobile electronic devices 100 in the group, by the audio server 120, and/or by a user operating one of the mobile electronic devices 100 to configure it as the master.

Figure 3:
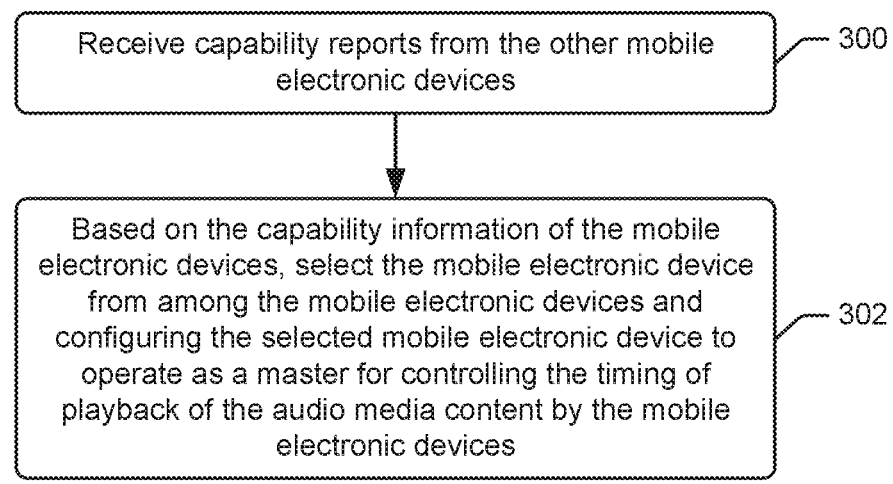
FIGS. 3-6 are flowcharts of operations that can be performed by one of the mobile electronic devices operating as the master and/or by the audio server operating as the master in accordance with some embodiments.

FIG. 3 is a flowchart of operations that may be performed by one of the mobile electronic devices 100 and/or by the audio server 120 to select the master device. Referring to FIG. 3, prior to the operation to determine 200 (FIG. 2) the timing of occurrence of the sound transient that is sensed by the microphone relative to the common time sync, the operations include receiving 300 capability reports from the other mobile electronic devices 100, where each of the capability reports contains capability information indicating at least one of processor speed, memory capacity, and quality of service of a communication link to an audio server configured to serve the audio media content for playout by the group of mobile electronic devices. Based on the capability information of the mobile electronic devices 100, the operations select 302 one of the mobile electronic devices from among the mobile electronic devices and configuring the selected mobile electronic device to operate as a master for controlling the timing of playout of the audio media content by the mobile electronic devices.

The master may control processing of the audio playout by the other mobile electronic devices 100. The control of processing of the audio playout may include providing parameters that are used for audio signal processing, such as audio filter parameters. The master may designate individual roles of the other mobile electronic devices 100 during the audio playout, such as by designating one or more of the mobile electronic devices 100 to emphasize output of a base frequency range of the audio, designate one or more other of the mobile electronic devices 100 to emphasize output of a mid-frequency range of the audio, in designate still one or more other of the mobile electronic devices 100 to emphasize a high-frequency range of the audio. Alternatively or additionally the master may control which of a plurality of audio channels of the media content are played by which of the mobile electronic devices 100, such as to provide stereo audio playout and/or more complex surround-sound multi-channel playout. When the media content provides more audio channels than there are mobile electronic devices, the master may combine two of more of the audio channels into a combined audio channel that is then provided to a selected one of the mobile electronic devices for playing or may provide an instruction to the selected mobile electronic device that commands it to combine the two of more of the audio channels into a combined audio channel for playing.

The master may select a soundfield profile from among a defined set of soundfield profiles based on how many mobile electronic devices 100 are within the group. For example, the master may control the mobile electronic devices 100 in the group to provide stereo left audio channel and right audio channel playout when only two mobile electronic devices 100 have joined the group. When a third mobile electronic devices 100 subsequently joins the group, the master may modify the audio playout to provide a soundfield profile that uses the capabilities of all three mobile electronic devices 100, such as providing left audio channel playout through the first mobile electronic devices 100, mid-audio channel (or mixture of right and left audio channels) playout through the second mobile electronic devices 100, and right audio channel playout through the third mobile electronic devices 100. When four mobile electronic devices 100 are in the group, the master may cause the first mobile electronic devices 100 to play the left audio channel, the second mobile electronic devices 100 to play the right audio channel, and the third and fourth mobile electronic devices 100 to play the mid-audio channel (or mixture of right and left audio channels). This logical operation can be extended to any plural number N of mobile electronic devices 100 that are initially present in the group or which may join the group after audio playout amongst the group has started. The master may decide which of the mobile electronic devices 100 in the group is to have the role of playing right, left, center, etc. of the audio channels based on their respective temporal vicinity to the preferred listening location where the sound transient was generated.

Figure 4:
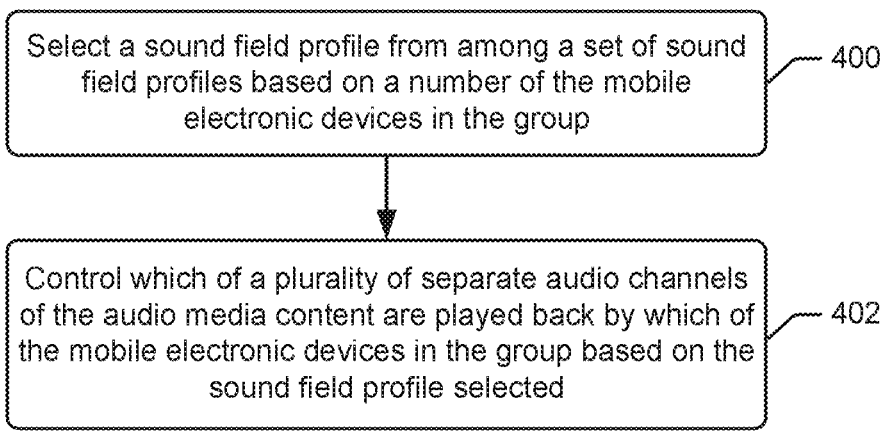

FIG. 4 is a flowchart of corresponding operations that can be performed by one of the mobile electronic devices 100 operating as the master and/or by the audio server 120 operating as the master. Referring to FIG. 4, the operations include selecting 400 a soundfield profile from among a set of soundfield profiles based on a number of the mobile electronic devices 100 in the group, and controlling 402 which of a plurality of separate audio channels of the audio media content are played back by which of the mobile electronic devices 100 in the group based on the selected soundfield profile. Further operations may include further controlling which of the plurality of separate audio channels of the audio media content are played back by which of the mobile electronic devices 100 in the group based on speaker capabilities identified for the mobile electronic devices 100 in the group. For example, when one of the mobile electronic devices 100 has a speaker capable of high power output low frequency response, the master may select a soundfield profile that more optimally uses the low frequency response of that mobile electronic device 100.

The master may mix and/or filter (e.g., adjust the frequency spectral waveform) of the audio channels to combine audio channels or to generate additional audio channels for playing through the mobile electronic devices 100 depending upon the number of mobile electronic devices 100 in the group and/or depending upon the number of different roles being assigned to the group. The operations for mixing and/or filtering the audio may be based on those disclosed in "An augmented acoustics demonstrator with realtime stereo up-mixing and binaural auralization", Master Thesis by Raffael Tonges, Technische Universität Berlin, 2015.

The operation for comparing 206 the timing of occurrence of the sound transient sensed by the microphone of one of the mobile electronic device 100 and the timing of occurrences indicated by the timing reports received from the other mobile electronic devices 100, may include cross-correlating between recordings of the sound transient sensed by the microphones to identify timing offsets between the timing of occurrences of receipt of the sound transient by the mobile electronic devices 100 (e.g., when sense by the microphones). The master (either the master mobile electronic device or the audio server 120) may determine a joint-playing soundfield based on the results of the cross-correlation so that a more optimal listening soundfield in created at the preferred listening location where the sound transient was generated. The joint-playing soundfield may be determined based on a determination of temporal vicinity of respective ones of the mobile electronic devices 100 to the preferred listening location where the sound transient was generated. In addition to controlling timing of playout of audio media content by each of the mobile electronic devices 100 in the group, the master may also assign roles to each of mobile electronic devices 100 in the group based on the number of mobile electronic devices 100 and their respective determined temporal vicinity.

The master may communicate instruction(s) to the mobile electronic devices 100 to start a listening mode that determines a timing of occurrence for when a sound transient is sensed by the microphone relative to the common time sync. A corresponding operation by the master can include transmitting a listening mode signal to the other mobile electronic devices 100 to initiate listening by the other mobile electronic devices 100 for occurrence of the sound transient and resulting transmissions of the timing reports. Once the mobile electronic devices 100 have all entered the listening mode, a user may generate the sound transient, e.g., hand clap, knock on a table, etc., at the preferred listening location or an application on one of the mobile electronic devices at the preferred listening location can output the sound transient toward the mobile electronic devices 100 for their separate sensing, measurement, and reporting to the master for processing.

Three approaches are now described which the master device may alternatively perform to control the coordinated audio stream playout by a group of the mobile electronic devices 100.

Figure 5:
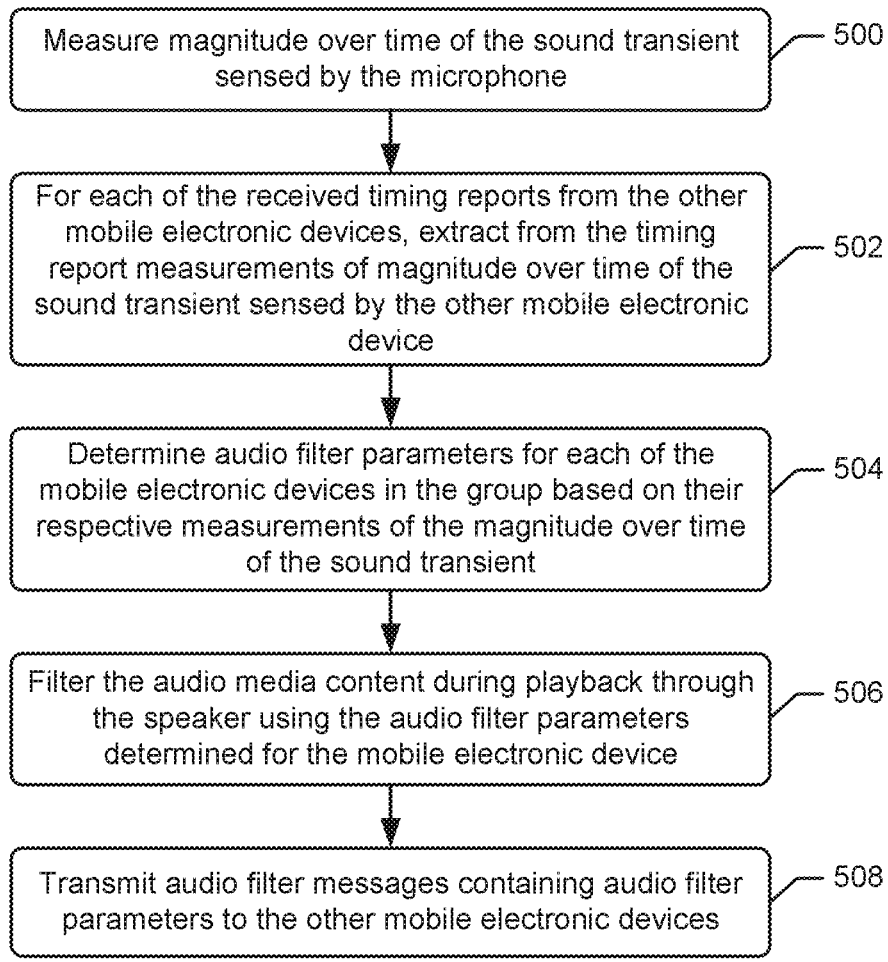

In a first approach, each of the mobile electronic devices 100 in the playout group has access to the audio media content, such as by having downloaded the content from the audio server 120 and/or by having established a communication link with the audio server 120 to receive streamed content. One of the mobile electronic devices 100 operating as a master sends audio filter parameters to the mobile electronic devices 100 for their use to control audio processing while playing the audio media content through their speakers. FIG. 5 is a flowchart of operations that may be performed by the master in accordance with this approach. Referring to FIG. 5, the master measures 500 magnitude over time of the sound transient sensed by the microphone. For each of the received timing reports from the other mobile electronic devices 100, the master device extracts 502 from the timing report measurements of magnitude over time of the sound transient sensed by the other mobile electronic device. The master determines 504 audio filter parameters for each of the mobile electronic devices 100 in the group based on their respective measurements of the magnitude over time of the sound transient. The master filters 506 the audio media content during playout through the speaker using the audio filter parameters determined for the mobile electronic device, and transmits 508 audio filter messages to the other mobile electronic devices 100 containing indications of the audio filter parameters determined for respective ones of the other mobile electronic devices 100 to control filtering of the audio media content during playout.

Figure 6:
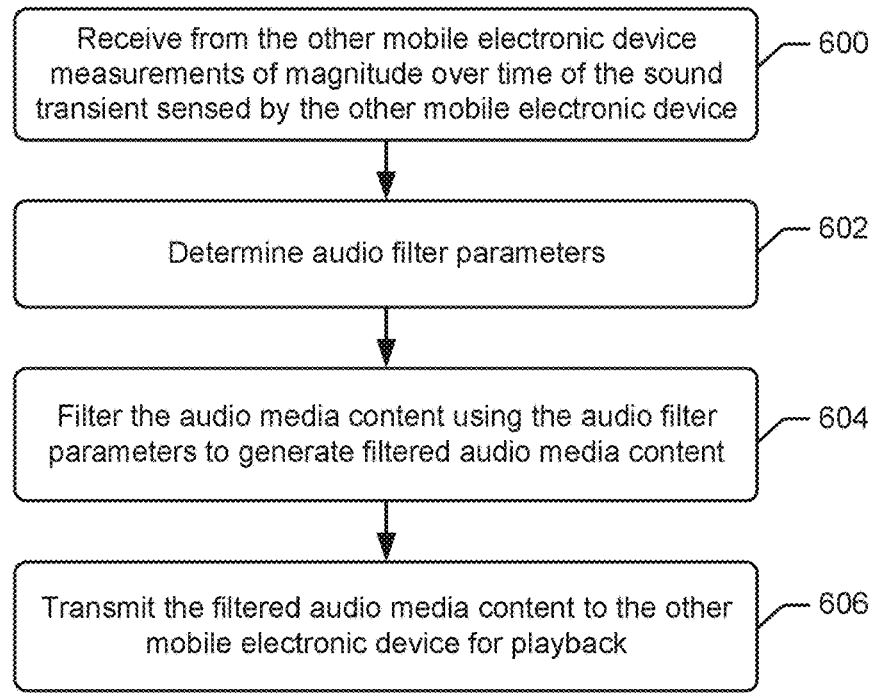

In a second approach, when one of the mobile electronic devices 100 is operating as a master and is the only one of the mobile electronic devices 100 that has access to the audio media content, the master can pre-process the audio media content that it then communicates to the other mobile electronic devices 100. FIG. 6 is a flowchart of operations that may be performed by the master in accordance with this approach. Referring to FIG. 6, the master receives 600 from the other mobile electronic devices 100 measurements of magnitude over time of the sound transient sensed by the other mobile electronic devices 100. The master determines 602 audio filter parameters based on comparison of the measurements of the magnitude over time of the sound transient to the measurements of the magnitude over time of the sound transient obtained from the other mobile electronic devices in the group. The master filters 604 the audio media content using the audio filter parameters to generate filtered audio media content. The master transmits 606 the filtered audio media content to the other mobile electronic devices for playout.

In a third approach, each of the mobile electronic devices 100 in the group can report their audio processing parameters to the audio server 120 which they are used to generate separate audio streams and/or audio files that are adapted specifically for playout by particular ones of the mobile electronic devices 100 based on the reported audio processing parameters. The audio server 120 may be configured to perform the operations described above for steps 600-606 in FIG. 6. In one embodiment, the mobile electronic devices 100 filter the audio media content that they played through their speaker based on audio filter parameters that are generated and provided by the audio server 120 to the mobile electronic devices 100. In this embodiment, a mobile electronic device 100 measures magnitude over time of the sound transient sensed by the microphone, and communicates to the audio server 120 indications of the measurements of magnitude over time of the of the sound transient. The mobile electronic device 100 then receives an audio filter message from the audio server 120 containing audio filter parameters, and filters the audio media content during playout through the speaker using the audio filter parameters. As will be explained in further detail below, the master (i.e., one of the mobile electronic devices 100 and/or the audio server) can generate audio filter parameters to provide a more optimized soundfield at the preferred listening location that is adapted based on the reverse sounding computations, based on loss of one or more of the mobile electronic devices 100 from the playout group, and/or based on addition of one or more new mobile electronic devices to the playout group.

In some other embodiments, the audio server 120 operates as the master to control timing of playout of the audio media content by the mobile electronic devices 100 in the playout group.

Figure 10:
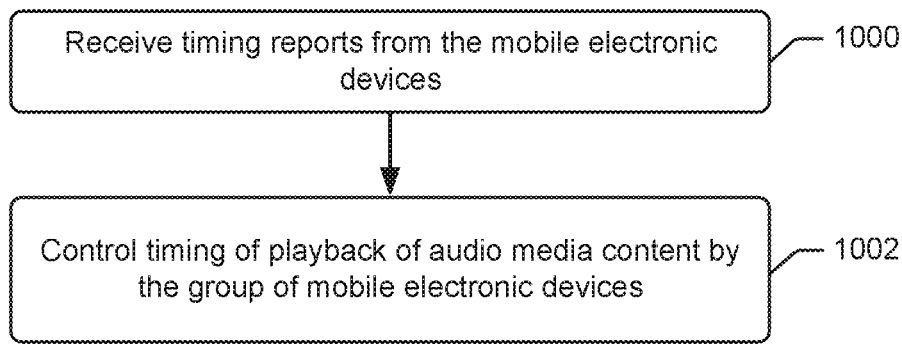
Figure 15:
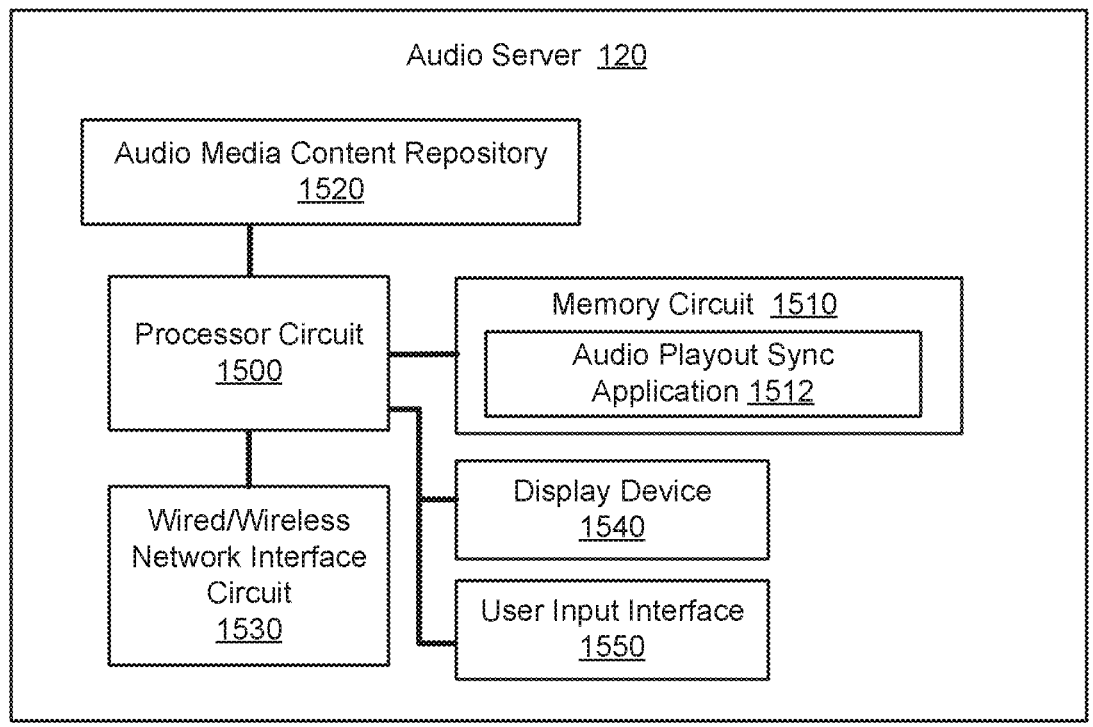
FIG. 15 is a block diagram of components of an audio server that are configured to operate in accordance with some embodiments of the present disclosure.

FIG. 10 is a flowchart of operations that may be performed by the audio server 120 operating as the master to control the coordinated playout of audio media content through a group of mobile electronic devices 100. FIG. 15 is a block diagram of elements of an audio server 120. Referring to FIGS. 10 and 15, the audio server 120 may include a network interface circuit 1530, a processor 1500, and a memory 1510 storing program code 1512 that is executed by the processor to perform operations. The operations can include receiving 1000 timing reports from the mobile electronic devices 100. Each of the timing reports can indicate a timing of occurrence of a sound transient sensed by a microphone of a respect one of the mobile electronic devices 100 relative to a common time sync shared among the mobile electronic devices 100. The sound transient that is sensed by the mobile electronic devices is generated at a preferred listening location 102 (FIG. 1). The operations further include controlling 1002 timing of playout of audio media content by the group of mobile electronic devices 100 responsive to comparison of the timing of occurrences indicated by the timing reports.

With the audio server 120 operating as the master, the operation for controlling 1002 timing of playout of audio media content by the group of mobile electronic devices 100 responsive to comparison of the timing of occurrences indicated by the timing reports, can include controlling timing when individual ones of the mobile electronic devices 100 in the group initiate the playout from a common location within the audio media content to reduce time offsets between when sound emitted by the individual ones of the mobile electronic devices 100 from the playout arrive at the preferred listening location 102 where the sound transient was generated.

Alternatively or additionally, with the audio server 120 operating as the master, the operation for controlling 1002 timing of playout of audio media content by the group of mobile electronic devices 100 responsive to comparison of the timing of occurrences indicated by the timing reports, can include the following operations. For each of the mobile electronic devices 100 in the group, the operations determine an audio playout start time relative to the common time sync based on comparison of the timing of occurrence of the sound transient sensed by the mobile electronic device 100 to the timing of occurrences of the sound transients sensed by other ones of the mobile electronic devices 100 in the group, and transmit a playout timing message to the mobile electronic device 100 containing an indication of the other audio playout start time relative to the common time sync. The operations for determining the audio playout start times for the mobile electronic devices 100 in the group may include determining time differences between the sound propagation times from the preferred listening location 102 where the sound transient was generated to the mobile electronic devices 100 in the group, based on differences between the timing of occurrences reported in the timing reports. The audio playout start times are then determined based on the time differences.

Figure 11:
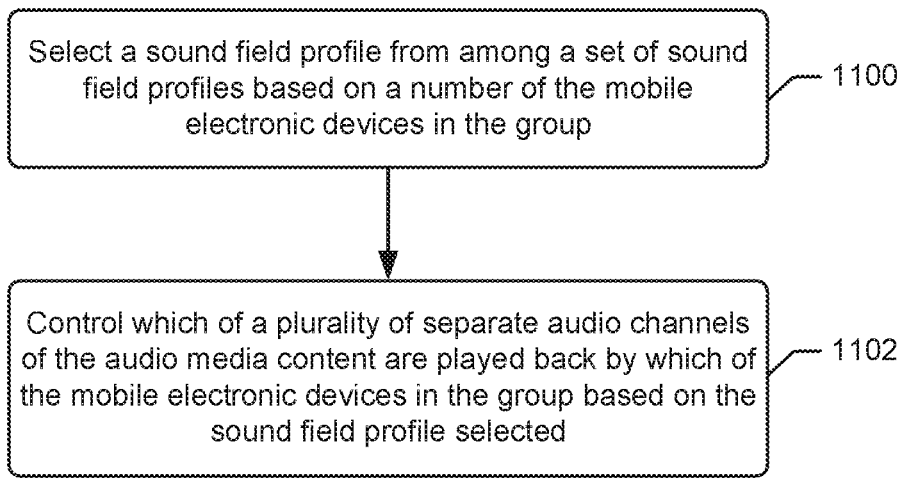

FIG. 11 is a flowchart of further operations that may be performed by the audio server 120 operating as the master to control the coordinated playout of audio media content through a group of mobile electronic devices 100. Referring to FIG. 11, the audio server 120 selects 1100 a soundfield profile from among a set of soundfield profiles based on a number of the mobile electronic devices 100 in the group. The audio server 120 controls 1102 which of a plurality of separate audio channels of the audio media content are played back by which of the mobile electronic devices 100 in the group based on the soundfield profile that is selected. Operations by the audio server 120 may further include controlling which of the plurality of separate audio channels of the audio media content are played back by which of the mobile electronic devices in the group based on speaker capabilities identified for the mobile electronic devices in the group.

The audio server 120 may control when the mobile electronic devices 100 and operate to listen for the sound transient to generate the associated report to the audio server 120. Audio server 120 may transmit a listening mode signal to the mobile electronic devices 100 to initiate listening by the mobile electronic devices 100 for occurrence of the sound transient and resulting transmissions of the timing reports to the audio server 120.

FIG. 12 is a flowchart of further operations that may be performed by the audio server 120 operating as the master to control the coordinated playout of audio media content through a group of mobile electronic devices 100. Referring to FIG. 12, the operation for receiving 1000 timing reports from the other mobile electronic devices 100, can include performing for each of the received timing reports a cross-correlation 1200 between recordings of the sound transient received in the timing reports to identify timing offsets between the timing of occurrences of the sound transient.

FIG. 13 is a flowchart of further operations that may be performed by the audio server 120 when operating as the master to control the coordinated playout of audio media content through a group of mobile electronic devices 100. Referring to FIG. 13, further operations can include receiving 1300 measurements of magnitude over time of the sound transient sensed by the mobile electronic devices 100 in the group. The operations can include determining 1302 audio filter parameters for each of the mobile electronic devices 100 in the group based on their respective measurements of the magnitude over time of the sound transient.

In one embodiment, the audio server 120 transmits 1304 audio filter messages to the mobile electronic devices 100 in the group containing indications of the audio filter parameters determined for respective ones of the mobile electronic devices to control their filtering of the audio media content during playout.

In an alternative embodiment, the audio server 120 filters 1306 the audio media content using the audio filter parameters to generate filtered audio media content, and communicates the filtered audio media content to the mobile electronic device 100 in the group for playout.

Figure 16:
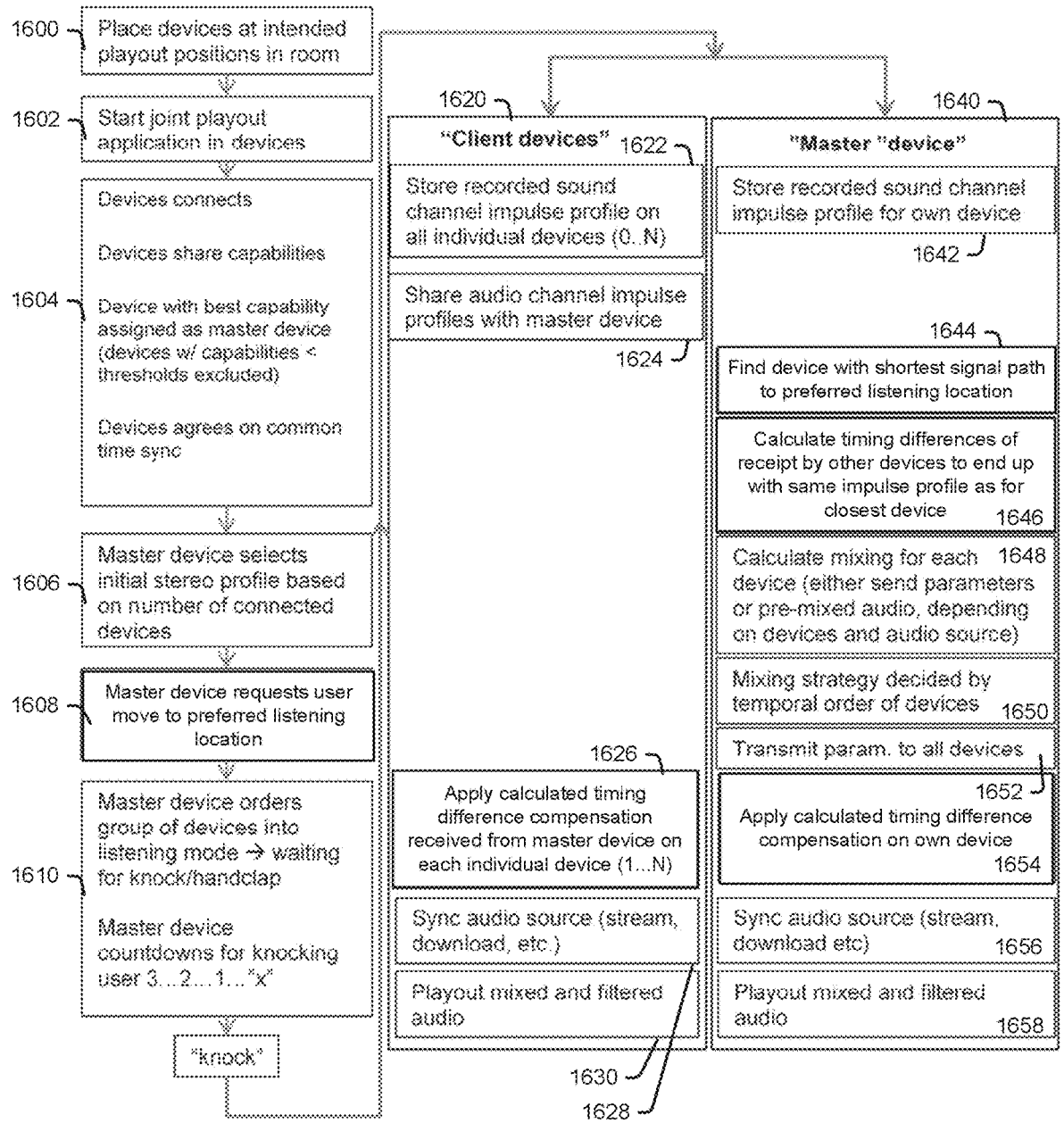
FIG. 16 is a flowchart that summarizes operations that can be performed by the users, one of the mobile electronic devices designated as the master device and the other mobile electronic devices designated as the client devices to provide more optimized playout of audio media content in accordance with some embodiments.

FIG. 16 is a flowchart that summarizes operations that can be performed by the users, one of the mobile electronic devices 100 designated as the master device 1640 and the other mobile electronic devices designated as the client devices 1620 to provide more optimized playout of audio media content in accordance with some embodiments.

Referring to FIG. 16, users place 1600 the mobile electronic devices (devices) at intended play positions in a room. The users start 1602 operation of a joint playout application in the devices. The devices operate 1604 to communicatively connect, share capabilities, identify one of the devices with the best capability to operate as the master device, and agree on a common time sync. The master device selects 1606 an initial stereo or multi-channel audio profile based on the number of connected devices in the playout group. The master device requests 1608 the user to locate to the preferred listening location. The master device orders 1610 the group of devices into a listening mode to wait for receipt of a sound transient created by a knock/handclap. The master device displays a countdown to the user when the user is to generate the sound transient. The client devices 1620, also refers to as slave devices or other mobile electronic devices, perform operations that store 1622 an audio channel impulse profile of the sensed sound transient and share 1624 the audio channel impulse profiles with the master device 1640. The master device 1640 performs operations to store 1642 an audio channel impulse profile of the sensed sound transient, find 1644 one of the devices having the shortest signal path to the preferred listening location, calculate 1646 timing differences between receipt of the sound transient by the devices to provide the same impulse profile as for the closest device, calculate audio mixing for each device (either by sending audio filter parameters or pre-mixed audio to the client devices 1620, depending on the devices and location of audio source). The master device 1640 may determine 1650 the audio filter parameters based on the timing differences of (between receipt of the sound transient by) the devices, such as relative to the device that has the least audio delay to receipt of the sound transient from the preferred listening location. Master device 1640 transmits 1652 the audio filter parameters to the client devices 1620. The master device 1640 performs 1654 timing difference compensation and/or other audio processing for audio playout based on the audio filter parameters, coordinates 1656 timing of playout of audio media content by the client devices 1620 in the master device 1640 to compensate for the timing differences, and plays-out 1658 the mixed and filtered audio from its speaker. The client devices 1620 perform 1626 timing compensation and/or other audio processing for audio playout based on the audio filter parameters, coordinate 1628 timing of playout of their audio media content based on signaling from the master device 1640 to compensate for their respective timing differences, and playout 1630 the mixed and filtered audio from their respective speakers. Thus, for example, devices that are closer to the preferred listening location may be controlled to delay their playout of a time instant in the media content compared to devices that are further from the preferred listening location, so that the audio playout from all of the devices is coordinated to arrive at nearly a same time to the preferred listening location.

Second Aspects Related to a Mobile Electronic Device or Audio Server Operating as a Master Playout of audio media content by the mobile electronic devices 100 in a group may be dynamically adapted by the master to compensate for loss of one or more of the mobile electronic devices 100 from the playout group and/or to compensate for the addition of one or more new mobile electronic devices 100 to the playout group. The master may perform the compensation using a pre-calculated table of audio filter parameters. For example, the master may refer to a pre-calculated table that identifies various alternative filter parameters that can be used by the mobile electronic devices during playout and which are selected among based on how many mobile electronic devices 100 are participating in the playout group.

Responsive to determining that one of the mobile electronic devices 100 is no longer available to participate in the playout group, the master selects based on the remaining number of mobile electronic devices 100 in the playout group a new entry in a table of audio filter parameters which is used by the master to filtered audio media content for playout by the remaining mobile electronic devices 100 or is communicated to the remaining mobile electronic devices 100 for their use when processing the audio media content for playout through their speakers. The master may determine that a mobile electronic device has left the playout group based on, for example, presence information periodically reported by each of the mobile electronic devices 100 and/or identifying an absence of signaling from one of the mobile electronic devices 100 for more than threshold time. The master may thereby dynamically respond to loss of a mobile electronic device 100 from the playout group by responsively selecting another entry from the table of audio filter parameters that will cause the remaining mobile electronic devices 100 in the playout group to adapt their playout to provide a more optimized soundfield.

In the scenario where only the master stores or retrieves (e.g., by streaming) the unprocessed audio content, the master may apply the newly selected audio filter parameters to filter the audio media content to result in adaptation of the soundfield, and stream the filtered audio media content to the respective mobile electronic devices 100 or communicate a filtered media content file to the respective mobile electronic devices 100 for playout. Alternatively, the master may communicate the newly selected audio filter parameters to the mobile electronic devices 100 for their respective use in adapting the soundfield of the audio media content, received in a stream or file from the master, which they then playout through their speakers.

Conversely, the master may respond to a determination that a new mobile electronic device 100 is available to join the playout group, by selecting a new entry in a table of audio filter parameters which is used by the master to filter the audio media content for playout by the new and previously existing mobile electronic devices 100 in the playout group. Alternatively, the selected audio filter parameters may be communicated to the new and existing mobile electronic devices 100 for their use when processing the audio media content for playout through their speakers. The master may repeat the operations for determining timing differences between receipt of the sound transient by the mobile electronic devices 100 (e.g., reverse sounding process) to determine the spatial positioning of the new mobile electronic device 100 relative to the preferred listening location 102. For example, the master may prompt the listening user to carry out a new knock/hand clap at the preferred listening location 102 for the new mobile electronic device 100 to sense and report to the master for use in selecting new audio filter parameters for use by the new mobile electronic device 100 and/or by the existing mobile electronic devices 100. As explained above, the roles of some or all of the mobile electronic devices 100 in the playout group can be modified responsive to addition of one or more new mobile electronic devices 100 to the playout group or loss of one or more of the mobile electronic devices 100 from the playout group.

In one variant of the above embodiment, the master may assign a playout role, for example playing lower base tones, to a new mobile electronic device 100 that is less affected by differences between audio travel time from the new mobile electronic device 100 to the preferred listening location 102 relative to the other mobile electronic devices 100 and the preferred listening location 102, until the reverse sounding process (i.e., process for compensating for audio travel time difference) is repeated. Upon completion of the repeated reverse sounding process, the master may assign another playout role to the new mobile electronic device 100.

Figure 7:
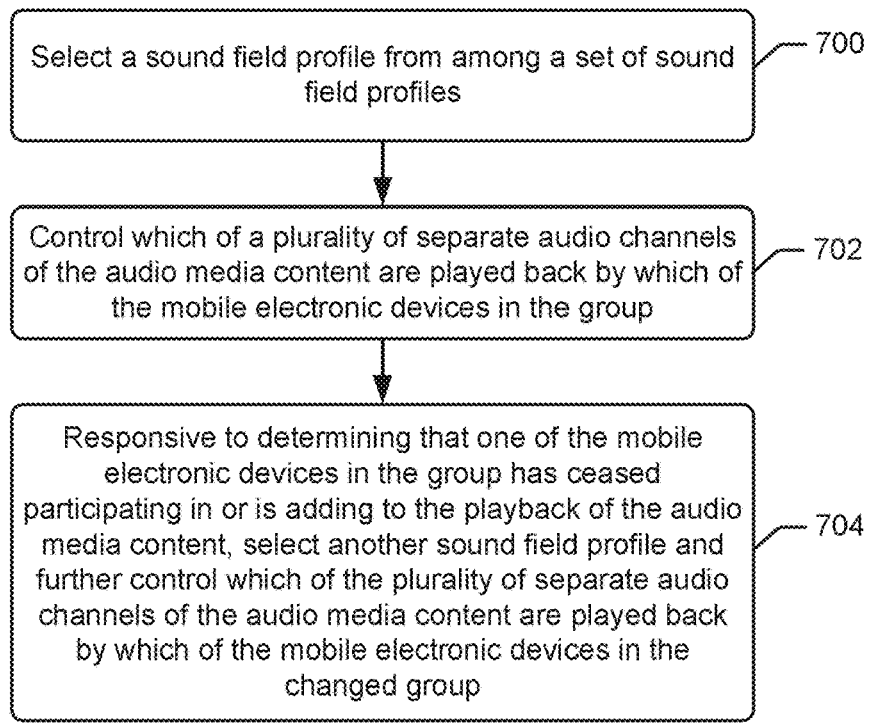
FIGS. 7-9 are flowcharts of operations that may be performed by one of the mobile electronic devices that is operating as a master for controlling playout of audio media content by the playout group in accordance with some embodiments.

FIG. 7 is a flowchart of operations that may be performed by one of the mobile electronic devices 100 that is operating as a master for controlling playout of audio media content by the playout group.

Referring to FIG. 7, in one embodiment, the master selects 700 a soundfield profile from among a set of soundfield profiles based on a number of the mobile electronic devices 100 in the playout group. The master controls 702 which of a plurality of separate audio channels of the audio media content are played back by which of the mobile electronic devices 100 in the playout group based on the selected soundfield profile. Responsive to determining 704 that one of the mobile electronic devices 100 in the playout group has ceased participating in the playout of the audio media content, the master selects another soundfield profile from among the set of soundfield profiles based on a remaining number of the mobile electronic devices 100 in the playout group, and further controls which of the plurality of separate audio channels of the audio media content are played back by which of the mobile electronic devices 100 remaining in the playout group based on the selected soundfield profile.

With continuing reference to FIG. 7, in another embodiment, the master selects 700 a soundfield profile from among a set of soundfield profiles based on a number of the mobile electronic devices 100 in the playout group. The master controls 702 which of a plurality of separate audio channels of the audio media content are played back by which of the mobile electronic devices 100 in the playout group based on the selected soundfield profile. Responsive to determining 704 that a new mobile electronic device seeks to join the playout group of mobile electronic devices 100 for playout of the audio media content, the master selects another soundfield profile from among the set of soundfield profiles based on the increased number of the mobile electronic devices 100 in the expanded group by addition of the new mobile electronic device, and further controls which of the plurality of separate audio channels of the audio media content are played back by which of the mobile electronic devices 100 in the expanded group based on the selected soundfield profile.

The operation to select 700 another soundfield profile from among the set of soundfield profiles based on the increased number of the mobile electronic devices 100 in the expanded group by addition of the new mobile electronic device, may include selecting a soundfield profile for an audio channel of the audio media content to be played by the new mobile electronic device that will decrease distortion perceived by a listener when the sound generated by the new mobile electronic devices arrives and combines at the preferred listening location 102, where the sound transient was generated, to combine with the sounds generated by other ones of the mobile electronic devices 100 in the expanded group of mobile electronic devices. The master controls the new mobile electronic device to playout the audio channel of the audio media content selected for the new mobile electronic device.

In some other embodiments, the audio server 120 operates as the master to control playout of the audio media content by the mobile electronic devices 100 in the playout group.

In one embodiment, the audio server 120 performs operations that include selecting a soundfield profile from among a set of soundfield profiles based on a number of the mobile electronic devices 100 in the playout group. The operations control which of a plurality of separate audio channels of the audio media content are played back by which of the mobile electronic devices 100 in the playout group based on the selected soundfield profile. Responsive to determining that one of the mobile electronic devices 100 in the playout group has ceased participating in the playout of the audio media content, the operations select another soundfield profile from among the set of soundfield profiles based on a remaining number of the mobile electronic devices 100 in the playout group, and further control which of the plurality of separate audio channels of the audio media content are played back by which of the mobile electronic devices 100 remaining in the group based on the selected soundfield profile.

In another embodiment, the operations by the audio server 120 include selecting a soundfield profile from among a set of soundfield profiles based on a number of the mobile electronic devices 100 in the playout group. The operations control which of a plurality of separate audio channels of the audio media content are played back by which of the mobile electronic devices 100 in the playout group based on the selected soundfield profile. Responsive to determining that a new mobile electronic device 100 seeks to join the playout group of mobile electronic devices 100 for playout of the audio media content, the operations select another soundfield profile from among the set of soundfield profiles based on the increased number of the mobile electronic devices 100 in the expanded group by addition of the new mobile electronic device 100, and further control which of the plurality of separate audio channels of the audio media content are played back by which of the mobile electronic devices 100 in the expanded group based on the selected soundfield profile.

The operation by the audio server 120 to select another soundfield profile from among the set of soundfield profiles based on the increased number of the mobile electronic devices 100 in the expanded group by addition of the new mobile electronic device 100, may include selecting a soundfield profile for an audio channel of the audio media content to be played by the new mobile electronic device 100 that will decrease distortion when the sound generated by the new mobile electronic devices 100 arrives at the preferred listening location 102, where the sound transient was generated, to combine with the sounds generated by other ones of the mobile electronic devices 100 in the expanded group of mobile electronic devices 100. The audio server 120 controls the new mobile electronic device 100 to playout the audio channel of the audio media content selected for the new mobile electronic device 100.

Third Aspects Related to a Mobile Electronic Device or Audio Server Operating as a Master The master may measure reverberation contained in the sound transients reported by the mobile electronic devices 100 to, for example, characterize reflections by physical objects, e.g., walls, present in the room. The master may measure other audio characteristics of the room based on data reported by the mobile electronic devices 100 for a sequence of sound transients event generated at the preferred listening location. The master may use this information when generating the audio filter parameters and/or when selecting the soundfield profile to be used by the various mobile electronic devices 100 in the playout group in order to achieve a more optimal playout at the preferred listening location.

Figure 8:
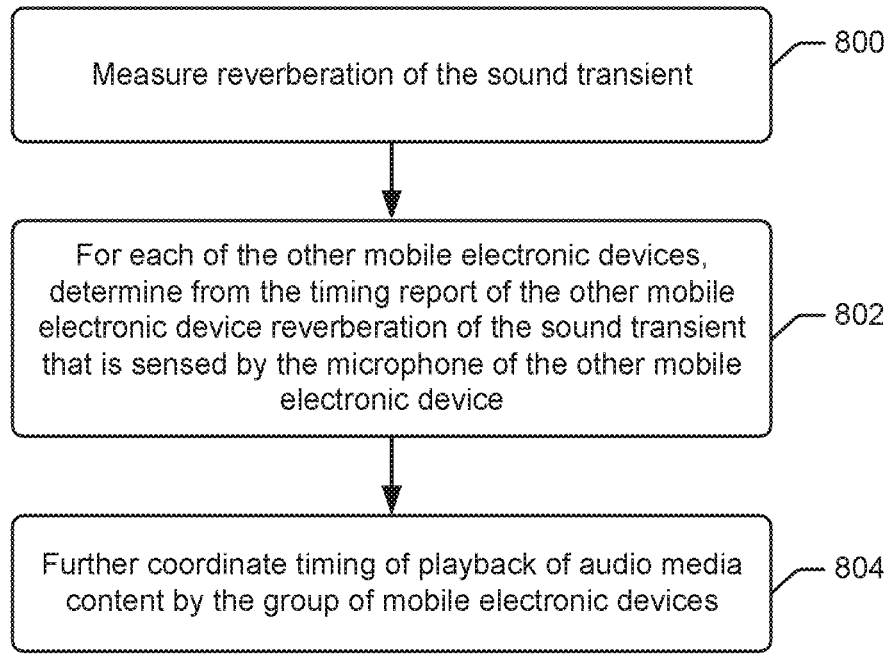

FIG. 8 is a flowchart of operations that may be performed by one of the mobile electronic devices 100 that is operating as a master for controlling playout of audio media content by the playout group. Referring to FIG. 8, the master measures 800 reverberation of the sound transient that is sensed by the microphone. For each of the other mobile electronic devices 100 in the playout group, the master determines 802 from the timing report of the other mobile electronic device 100 reverberation of the sound transient that is sensed by the microphone of the other mobile electronic device 100. The master for the coordinates 804 timing of playout of audio media content by the group of mobile electronic devices 100 responsive to comparison of the measurements of reverberations by the mobile electronic devices 100 in the playout group.

Fourth Aspects Related to a Mobile Electronic Device or Audio Server Operating as a Master The master may determine a desired echo and/or reverberation that is to be generated at the preferred listening location during playout of the audio media content by the mobile electronic devices 100, and determine timing differences between receipt of the sound transient by the group of the mobile electronic devices 100 and playout delay settings that are used when coordinating timing of playout of audio media content by the group of mobile electronic devices 100.

In some embodiments, the audio server 120 operates as the master to control playout of the audio media content by the mobile electronic devices 100 in the playout group. In one embodiment, the audio server 120 operates to, for each of the mobile electronic devices 100, determine from the timing report of the mobile electronic device 100 reverberation of the sound transient that is sensed by the microphone of the mobile electronic device 100. The audio server 120 operates to further control timing of playout of audio media content by the playout group of mobile electronic devices 100 responsive to comparison of the measurements of reverberations by the mobile electronic devices 100 in the playout group.

Fifth Aspects Related to a Mobile Electronic Device or Audio Server Operating as a Master When the master detects one or more of the playout-devices are being moved from their respective initial positions, the master responds to determining that one or more dislocations has become larger than a predefined threshold by pausing the audio playout of the mobile electronic devices 100 and initiating another reverse sounding process. Alternatively, when the remaining duration of an ongoing audio playout (e.g., song) is less than a defined duration, the master may wait for the audio playout to complete and then initiate another reverse sounding process before allowing another audio playout (e.g., next song in playlist) to begin playout by the mobile electronic devices 100 in the playout group.

Figure 9:
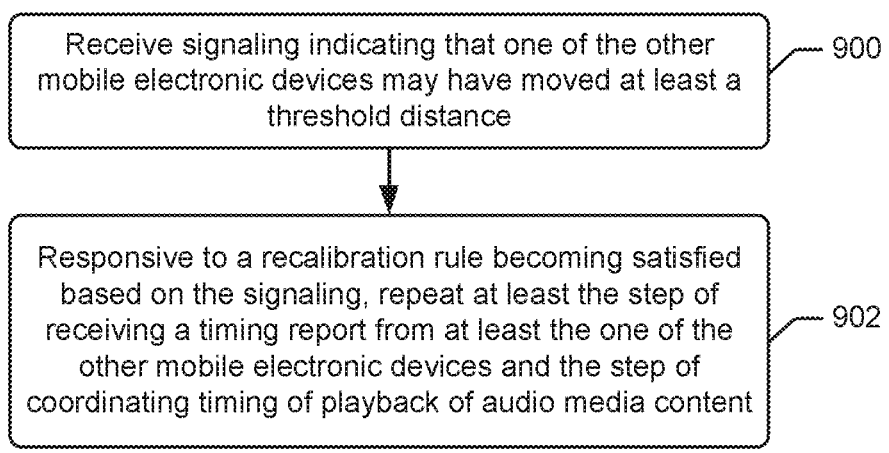

FIG. 9 is a flowchart of operations that may be performed by one of the mobile electronic devices 100 that is operating as a master for controlling playout of audio media content by the playout group. Referring to FIG. 9, the master receives 900 signaling indicating that one of the other mobile electronic devices 100 may have moved at least a threshold distance. Responsive to a recalibration rule becoming satisfied based on the signaling, the master repeats 902 at least the step of receiving 204 (FIG. 2) a timing report from at least the one of the other mobile electronic devices 100 and the step of coordinating 206 (FIG. 2) timing of playout of audio media content.

When the audio server 120 is operating as the master to control playout of the audio media content by the mobile electronic devices 100, the audio server 120 receives signaling indicating that one of the other mobile electronic devices 100 may have moved at least a threshold distance. Responsive to a recalibration rule becoming satisfied based on the signaling, the audio server 120 repeats at least the step of receiving 1000 (of FIG. 10) a timing report from at least the one of the other mobile electronic devices and the step of coordinating 1002 (of FIG. 10) timing of playout of audio media content.

Sixth Aspects Related to an Audio Server Operating as the Master

The mobile electronic devices 100 which belong to a playout group may each execute an application for streaming music (or other audio content), such as Spotify, from an audio server 120 that is configured to support synchronized playout of the music using the mobile electronic devices 100 as distributed speakers. The mobile electronic devices 100 in the playout group may report their captured sound transients to the audio server 120 associated with the application. The audio server 120 manages reverse sounding processes, time synchronization, adjusts the filter parameters and/or the sound field of the mobile electronic devices 100 of the playout group, and controls timing of playout of the music through the mobile electronic devices 100. The audio server 120 generates a dedicated music stream for each of the mobile electronic devices 100 in the playout group, where each stream may be generated according to various operations described above for the first aspects section. This may be advantageous in that the resource (battery) demanding processing for operations of reverse sounding, filter parameters and/or sound field selection, time synchronization, and controlling timing of playout are primarily performed by the audio server 120 instead of by the battery-powered mobile electronic devices 100.

Various operations that can also be performed by the audio server 120 operating as the master have been described above including with regard to FIGS. 10-13.

Figure 17:
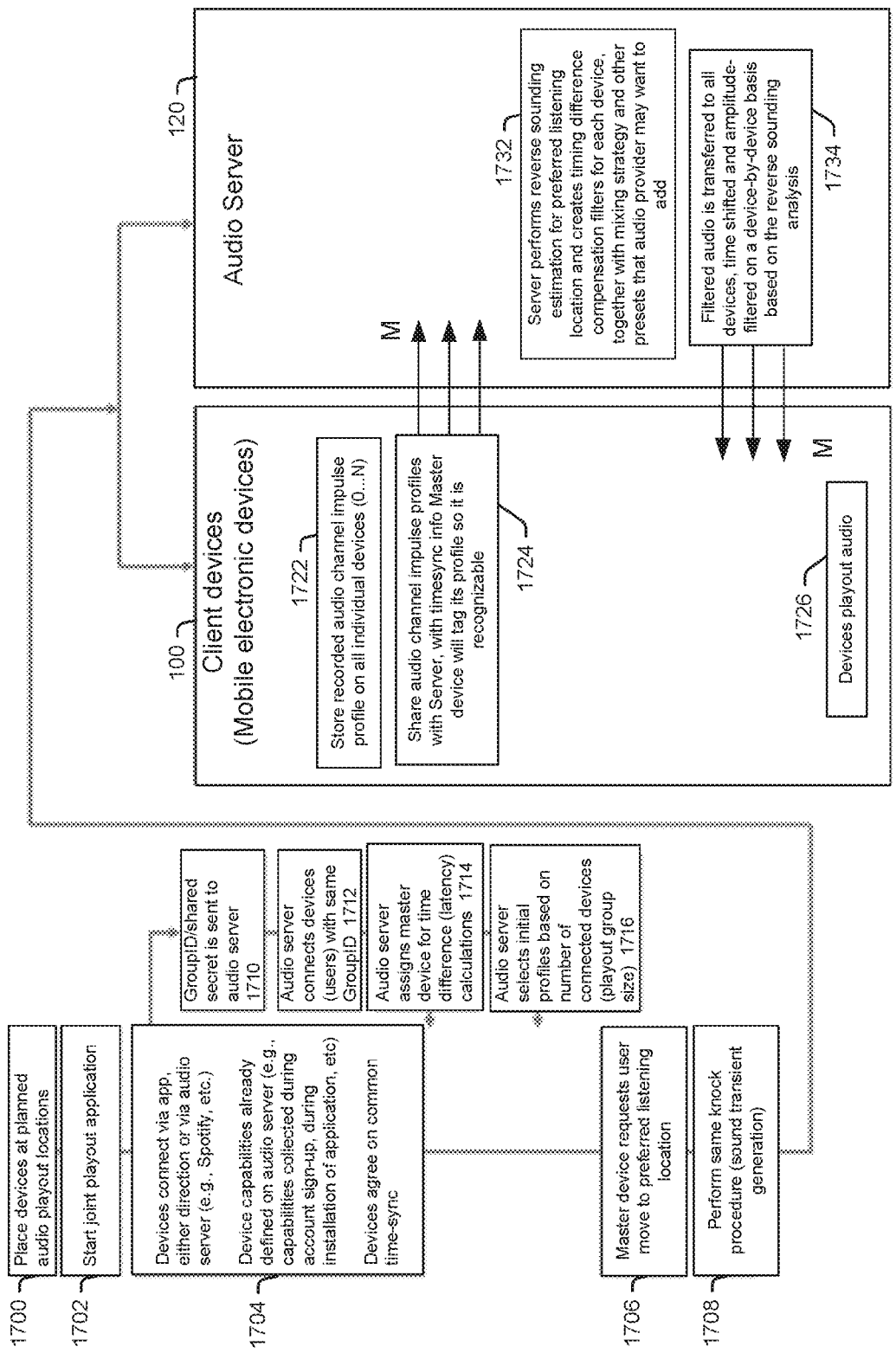
FIG. 17 is a flowchart that summarizes operations that can be performed by the users, the mobile electronic devices, and the audio server to provide more optimized playout of audio media content through the mobile electronic devices in accordance with some embodiments.

FIG. 17 is a flowchart that summarizes operations that can be performed by the users, the mobile electronic devices 100 (referred to as "client devices: in FIG. 17), and the audio server 120 (referred to as "server" in FIG. 17) to provide more optimized playout of audio media content through the mobile electronic devices 100 in accordance with some embodiments.

Referring to FIG. 17, users place 1700 the mobile electronic devices (devices) at intended play positions in a room. The users start 1702 operation of a joint playout application in the devices. The devices operate 1704 to communicatively connect, share capabilities, identify one of the devices with the best capability to operate as the master device, and agree on a common time sync. In some embodiments, the operations include: the devices communicating 1710 a group ID/shared secret to the audio server 120; the audio server 120 connects 1712 users having a same group ID to form a playout group; the audio server 120 assigns 1714 a master device for latency and other sound transient related calculations; and the audio server selects an initial soundfield profile based on the number of mobile electronic devices in the playout group. The master device requests 1706 the user to locate to the preferred listening location, which can also be referred to as the preferred listening location. The master device orders 1708 the group of devices into a listening mode to wait for receipt of a sound transient created by a knock/handclap. The master device displays a countdown to the user when the user is to generate the sound transient.

The mobile electronic devices 100, also referred to as client devices, perform operations that store 1722 an audio channel impulse profile of the sensed sound transient and share 1724 the audio channel impulse profiles with the audio server 120. The audio server 120 performs 1732 estimation of timing differences between receipt by the mobile electronic devices 100 of the sound transient generated from the preferred listening location, and generates audio filter parameters the compensate for differences in the timing of receipt of the sound transients by the client devices. The audio server 120 can use 1734 the audio filter parameters to filter the audio content that is then transferred to each of the client devices, and can provide time shift and amplitude-filter correction that compensates for the audio characteristics of the room and the positioning of the client devices relative to the preferred listening location. The client devices receive the audio content from the audio server 120 and play the audio content through their respective speakers.

Cloud Implementation

Some or all operations described above as being performed by the mobile electronic devices 100 and/or the audio server 120 may alternatively be performed by another node that is part of a cloud computing resource. For example, those operations can be performed as a network function that is close to the edge, such as in a cloud server or a cloud resource of a telecommunications network operator, e.g., in a CloudRAN or a core network, and/or may be performed by a cloud server or a cloud resource of a media provider, e.g., iTunes service provider or Spotify service provider.

Example Mobile Electronic Device and Audio Server

FIG. 14 is a block diagram of components of a mobile electronic device 100 that are configured in accordance with some other embodiments of the present disclosure. The mobile electronic device 100 can include a wireless network interface circuit 1420, a location determination and/or motion determination circuit 1430, a microphone 1440, an audio output interface 1450 (e.g., speaker, headphone jack, wireless transceiver for connecting to wireless headphones), a display device 1460, a user input interface 1470 (e.g., keyboard or touch sensitive display), at least one processor circuit 1400 (processor), and at least one memory circuit 1410 (memory). The processor 1400 is connected to communicate with the other components. The memory 1410 stores an audio playout synchronization application 1412 that is executed by the processor 1400 to perform operations disclosed herein. The processor 1400 may include one or more data processing circuits, such as a general purpose and/or special purpose processor (e.g., microprocessor and/or digital signal processor), which may be collocated or distributed across one or more data networks. The processor 1400 is configured to execute computer program instructions in the memory 1410, described below as a computer readable medium, to perform some or all of the operations and methods for one or more of the embodiments disclosed herein for a mobile electronic device.

FIG. 15 is a block diagram of components of an audio server 120 which operate according to at least some embodiments of the present disclosure. The audio server 120 can include a network interface circuit 1530, at least one processor circuit 1500 (processor), and at least one memory circuit 1510 (memory). The network interface circuit 1530 is configured to communicate with mobile electronic devices via networks which can include wireless and wired networks. The audio server 120 may further include the audio playout synchronization application 1512 to synchronize playout of audio media content from an audio media content repository 1520 by the mobile electronic devices. The audio media content repository 1520 may be part of the audio server 120 or may be communicatively networked to the audio server 120 through the network interface circuit 1530. The audio server 120 may further include a display device 1540 and a user input interface 1550. The memory 1510 stores program code that is executed by the processor 1500 to perform operations. The processor 1500 may include one or more data processing circuits, such as a general purpose and/or special purpose processor (e.g., microprocessor and/or digital signal processor), which may be collocated or distributed across one or more data networks. The processor 1500 is configured to execute computer program instructions among program code in the memory 1510, described below as a computer readable medium, to perform some or all of the operations and methods for one or more of the embodiments disclosed herein for a map route server.

Further Definitions and Embodiments:

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A mobile electronic device operating with other mobile electronic devices forming a group for coordinated playout of audio media content, the mobile electronic device comprising:
 a wireless network interface circuit configured for communication with the other mobile electronic devices through a wireless communication link;
 a microphone;
 a speaker;
 a processor operationally connected to the microphone, the speaker, and the wireless network interface circuit; and
 a memory storing program code that is executed by the processor to perform operations comprising:
  determining a common time sync shared with the other mobile electronic devices;
  determining a timing of occurrence of a sound transient that is sensed by the microphone relative to the common time sync;
  receiving timing reports from the other mobile electronic devices, wherein each of the timing reports indicates a timing of occurrence of the sound transient sensed by a microphone of a respective one of the other mobile electronic devices relative to the common time sync, wherein the sound transient sensed by the mobile electronic devices is generated at a preferred listening location that is separate from the mobile electronic device and the other mobile electronic devices; and
  coordinating timing of playout of audio media content by the group of mobile electronic devices responsive to comparison of the timing of occurrence of the sound transient sensed by the microphone of the mobile electronic device and the timing of occurrences indicated by the timing reports.

2. The mobile electronic device of claim 1, wherein the operation for coordinating timing of playout of audio media content by the group of mobile electronic devices responsive to comparison of the timing of occurrence of the sound transient sensed by the microphone of the mobile electronic device and the timing of occurrences indicated by the timing reports, comprises:
 controlling timing when individual ones of the mobile electronic devices in the group initiate the playout from a common location within the audio media content to reduce time offsets between when sound emitted by the individual ones of the mobile electronic devices from the playout arrive at the preferred listening location where the sound transient was generated.

3. The mobile electronic device of claim 1, wherein the operation for coordinating timing of playout of audio media content by the group of mobile electronic devices responsive to comparison of the timing of occurrence of the sound transient sensed by the microphone of the mobile electronic device and the timing of occurrences indicated by the timing reports, comprises:
 for the mobile electronic device,
  determining an audio playout start time relative to the common time sync based on comparison of the timing of occurrence of the sound transient sensed by the mobile electronic device to the timing of occurrences of the sound transients sensed by other ones of the mobile electronic devices, and
  initiating playout from a common location within the audio media content from the memory through the speaker when the audio playout start time satisfies a defined rule relative to the common time sync; and
 for each of the other mobile electronic devices,
  determining another audio playout start time relative to the common time sync based on comparison of the timing of occurrence of the sound transient sensed by the other mobile electronic device to the timing of occurrences of the sound transients sensed by other ones of the mobile electronic devices, and
  transmitting a playout timing message to the other mobile electronic device containing an indication of the other audio playout start time relative to the common time sync indicating when the other mobile electronic device is to initiate playout from the common location within the audio media content.

4. The mobile electronic device of claim 3, wherein the operations for determining the audio playout start time for the mobile electronic device and for the other mobile electronic devices, comprise:
 determining time differences between sound propagation times from the preferred listening location where the sound transient was generated to the mobile electronic devices in the group based on differences between the timing of occurrences sensed by the mobile electronic devices in the group; and
 determining the audio playout start time for individual ones of the mobile electronic devices in the group based on the time differences.

5. The mobile electronic device of claim 1, prior to the operation to determine the timing of occurrence of the sound transient that is sensed by the microphone relative to the common time sync, the operations further comprising:
 receiving capability reports from the other mobile electronic devices, wherein each of the capability reports contains capability information indicating at least one of processor speed, memory capacity, and quality of service of a communication link to an audio server configured to serve the audio media content for playout by the group of mobile electronic devices; and
 based on the capability information of the mobile electronic devices, selecting one of the mobile electronic devices from among the mobile electronic devices and configuring the selected mobile electronic device to operate as a master for controlling the timing of playout of the audio media content by the mobile electronic devices.

6. The mobile electronic device of claim 1, wherein the operations further comprise:
 transmitting a listening mode signal to the other mobile electronic devices to initiate listening by the other mobile electronic devices for occurrence of the sound transient and resulting transmissions of the timing reports.

7. The mobile electronic device of claim 1, wherein the operation for comparison of the timing of occurrence of the sound transient sensed by the microphone of the mobile electronic device and the timing of occurrences indicated by the timing reports, comprises:

cross-correlating between recordings of the sound transient sensed by the microphone of the mobile electronic device and received recordings of the sound transient sensed by the microphones of the mobile electronic devices in the timing reports to identify timing offsets between the timing of occurrences of the sound transient.

8. The mobile electronic device of claim 1, further comprising:

measuring magnitude over time of the sound transient sensed by the microphone;

for each of the received timing reports from the other mobile electronic devices, extracting from the timing report measurements of magnitude over time of the sound transient sensed by the other mobile electronic device;

determining audio filter parameters for each of the mobile electronic devices in the group based on their respective measurements of the magnitude over time of the sound transient;

filtering the audio media content during playout through the speaker using the audio filter parameters determined for the mobile electronic device; and transmitting audio filter messages to the other mobile electronic devices containing indications of the audio filter parameters determined for respective ones of the other mobile electronic devices to control filtering of the audio media content during playout.

9. The mobile electronic device of claim 1, further comprising:

receiving from the other mobile electronic devices measurements of magnitude over time of the sound transient sensed by the other mobile electronic devices, determining audio filter parameters based on comparison of the measurements of the magnitude over time of the sound transient to the measurements of the magnitude over time of the sound transient obtained from the other mobile electronic devices in the group, filtering the audio media content using the audio filter parameters to generate filtered audio media content, and transmitting the filtered audio media content to the other mobile electronic devices for playout.

10. The mobile electronic device of claim 1, further comprising:

measuring magnitude over time of the sound transient sensed by the microphone;

communicating to an audio server indications of the measurements of magnitude over time of the of the sound transient;

receiving an audio filter message from the audio server containing audio filter parameters; and filtering the audio media content during playout through the speaker using the audio filter parameters.

11. The mobile electronic device of claim 1, wherein the operations further comprise:

selecting a soundfield profile from among a set of soundfield profiles based on a number of the mobile electronic devices in the group;

controlling which of a plurality of separate audio channels of the audio media content are played back by which of the mobile electronic devices in the group based on the soundfield profile selected; and responsive to determining that one of the mobile electronic devices in the group has ceased participating in the playout of the audio media content, selecting another soundfield profile from among the set of soundfield profiles based on a remaining number of the mobile electronic devices in the group, and further controlling which of the plurality of separate audio channels of the audio media content are played back by which of the mobile electronic devices remaining in the group based on the another soundfield profile that is selected.

12. The mobile electronic device of claim 1, wherein the operations further comprise:

selecting a soundfield profile from among a set of soundfield profiles based on a number of the mobile electronic devices in the group;

controlling which of a plurality of separate audio channels of the audio media content are played back by which of the mobile electronic devices in the group based on the soundfield profile selected; and responsive to determining that a new mobile electronic device seeks to join the group of mobile electronic devices for playout of the audio media content, selecting another soundfield profile from among the set of soundfield profiles based on the increased number of the mobile electronic devices in the expanded group by addition of the new mobile electronic device, and further controlling which of the plurality of separate audio channels of the audio media content are played back by which of the mobile electronic devices in the expanded group based on the another soundfield profile that is selected.

13. The mobile electronic device of claim 1, wherein the sound transient is generated by other than the mobile electronic device or the other mobile electronic devices.

14. A method by a mobile electronic device operating with other mobile electronic devices forming a group for coordinated playout of audio media content, the method comprising:

determining a common time sync shared with the other mobile electronic devices;

determining a timing of occurrence of a sound transient that is sensed by a microphone of the mobile electronic device relative to the common time sync;

receiving timing reports from the other mobile electronic devices, wherein each of the timing reports indicates a timing of occurrence of the sound transient sensed by a microphone of a respect one of the other mobile electronic devices relative to the common time sync, wherein the sound transient sensed by the mobile electronic devices is generated at a preferred listening location that is separate from the mobile electronic device and the other mobile electronic devices; and coordinating timing of playout of audio media content by the group of mobile electronic devices responsive to comparison of the timing of occurrence of the sound transient sensed by the microphone of the mobile electronic device and the timing of occurrences indicated by the timing reports.

15. The method of claim 14, wherein the operation for coordinating timing of playout of audio media content by the group of mobile electronic devices responsive to comparison of the timing of occurrence of the sound transient sensed by the microphone of the mobile electronic device and the timing of occurrences indicated by the timing reports, comprises:

controlling timing when individual ones of the mobile electronic devices in the group initiate the playout from a common location within the audio media content to reduce time offsets between when sound emitted by the individual ones of the mobile electronic devices from the playout arrive at the preferred listening location where the sound transient was generated.

16. An audio server for coordinated playout of audio media content through a group of mobile electronic devices, the audio server comprising:
  a network interface circuit configured for communication with the mobile electronic devices;
  a processor operationally connected to the network interface circuit; and
  a memory storing program code that is executed by the processor to perform operations comprising:
    receiving timing reports from the mobile electronic devices, wherein each of the timing reports indicates a timing of occurrence of a sound transient sensed by a microphone of a respect one of the mobile electronic devices relative to a common time sync shared among the mobile electronic devices, wherein the sound transient sensed by the mobile electronic devices is generated at a preferred listening location that is separate from the mobile electronic device and the other mobile electronic devices; and
    controlling timing of playout of audio media content by the group of mobile electronic devices responsive to comparison of the timing of occurrences indicated by the timing reports.

17. The audio server of claim 16, further comprising:
  receiving measurements of magnitude over time of the sound transient sensed by the mobile electronic devices in the group;
  determining audio filter parameters for each of the mobile electronic devices in the group based on their respective measurements of the magnitude over time of the sound transient; and
  transmitting audio filter messages to the mobile electronic devices in the group containing indications of the audio filter parameters determined for respective ones of the mobile electronic devices to control their filtering of the audio media content during playout.

18. The audio server of claim 16, wherein the operations further comprise:
  selecting a soundfield profile from among a set of soundfield profiles based on a number of the mobile electronic devices in the group;
  controlling which of a plurality of separate audio channels of the audio media content are played back by which of the mobile electronic devices in the group based on the soundfield profile selected; and
  responsive to determining that one of the mobile electronic devices in the group has ceased participating in the playout of the audio media content,
    selecting another soundfield profile from among the set of soundfield profiles based on a remaining number of the mobile electronic devices in the group, and
    further controlling which of the plurality of separate audio channels of the audio media content are played back by which of the mobile electronic devices remaining in the group based on the another soundfield profile that is selected.

19. The audio server of claim 16, wherein the operations further comprise:
  selecting a soundfield profile from among a set of soundfield profiles based on a number of the mobile electronic devices in the group;
  controlling which of a plurality of separate audio channels of the audio media content are played back by which of the mobile electronic devices in the group based on the soundfield profile selected; and
  responsive to determining that a new mobile electronic device seeks to join the group of mobile electronic devices for playout of the audio media content,
    selecting another soundfield profile from among the set of soundfield profiles based on the increased number of the mobile electronic devices in the expanded group by addition of the new mobile electronic device, and
    further controlling which of the plurality of separate audio channels of the audio media content are played back by which of the mobile electronic devices in the expanded group based on the another soundfield profile that is selected.

20. The audio server of claim 16, wherein the operations further comprise:
  for each of the mobile electronic devices, determining from the timing report of the mobile electronic device reverberation of the sound transient that is sensed by the microphone of the mobile electronic device; and
  further controlling timing of playout of audio media content by the group of mobile electronic devices responsive to comparison of the measurements of reverberations by the mobile electronic devices in the group.

21. The audio server of claim 16, wherein the operations further comprise:
  receiving signaling indicating that one of the other mobile electronic devices may have moved at least a threshold distance; and
  responsive to a recalibration rule becoming satisfied based on the signaling, repeating at least the step of receiving a timing report from at least the one of the other mobile electronic devices and the step of coordinating timing of playout of audio media content.

* * * * *